Nov. 22, 1960  C. A. WINTER  2,960,857
AUTOMOBILE WHEEL CHOCK
Filed Nov. 24, 1958

INVENTOR.
Charles A. Winter
BY WHITEHEAD, VOGL & LOWE
PER Frank C. Lowe
ATTORNEYS

United States Patent Office 2,960,857
Patented Nov. 22, 1960

2,960,857

AUTOMOBILE WHEEL CHOCK

Charles A. Winter, Denver, Colo., assignor to Rhino Products Corp., a corporation of Colorado Filed Nov. 24, 1958, Ser. No. 776,015

1 Claim. (Cl. 70—19)

This invention relates to vehicle immobilizing devices, and more particularly to wheel chocks, the primary object of the invention being to provide a novel and improved automobile wheel chock. As such, the invention will be hereinafter referred to as a wheel chock or simply as a chock.

Another object of the invention is to provide a novel and improved wheel chock which will effectively immobilize an automobile when mounted upon a wheel thereof as for policing purposes by public and private authority when an automobile is illegally parked or when it is desired to force the vehicle owner to check with the authorities to obtain its release.

Another object of the invention is to provide a novel and improved wheel chock which is adapted to embrace the tire of an automobile and securely grip the rim thereof with substantial pressure and thereby effectively secure the chock to the wheel.

Another object of the invention is to provide in a novel and improved rim-gripping chock, means to hold the chock onto the rim with considerable unyielding pressure sufficient to render improper removal of the chock from the wheel or removal of the wheel itself impossible without severe damage to the wheel and/or to the wheel rim.

Yet another object of the invention is to provide in a rim-gripping wheel chock, an arrangement of locking means which cannot be tampered with to remove the chock from an automobile wheel and an arrangement of cover means which prevents removal of the wheel from its hub.

Yet other objects of the invention are to provide an improved wheel chock which is constructed as an extremely simple, light-weight, neat-appearing design and which is strong, rugged and substantially fool-proof in use.

With the foregoing and other objects in view, all of which more fully hereinafter appear, my invention comprises certain novel and improved constructions, combinatoins and arrangements of parts and elements as hereinafter described, defined in the appended claims and illustrated in preferred embodiment in the accompanying drawing, in which:

Figure 1 is a side elevation view of a fragmentary portion of an automobile and wheel thereof, illustrating my improved chock mounted upon the wheel to immobilize the automobile.

Figure 2 is an elevation view of the chock per se, as taken from the indicated arrow 2 at Fig. 1, but on an enlarged scale and with the chock open preliminary to being mounted upon a wheel, and with broken lines indicating a fragment of a wheel, its rim and tire as in the embrace of the chock and with the locking element being removed to permit the use of a wrench to tighten the chock in place upon the rim.

Figure 1:
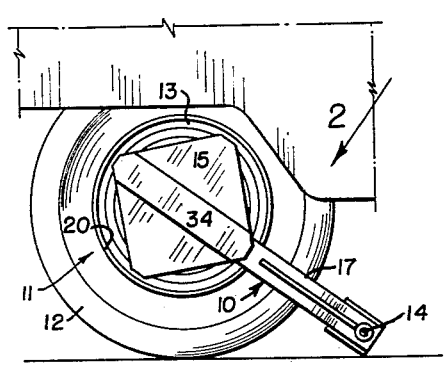

The use of wheel chocks is an old art, the general design of a chock being to provide a pair of hinged arms which are adapted to embrace the tire and sometimes the rim of an automobile wheel and to be locked in position by a lug or pin being inserted in registering openings in the arms. However, such conventional chocks are not completely satisfactory for their intended purposes in that they are usually made as heavy, expensive units. They are completely unsatisfactory for use by individuals where cost and weight is a factor. Also, they are not satisfactory in that they tend to embrace, but not grip, a wheel and rim and can be made to slip on the wheel. Because of such and other disadvantages, it follows that there is a need for an improved chock which is of a light-weight, yet rugged construction, which will tightly grip an automobile wheel rim and which is otherwise substantially fool-proof in use.

With such in view, the present invention was conceived and developed to provide for an improved rim-gripping type unit which unyieldingly applies pressure to the rim of an automobile wheel to prevent its removal therefrom, and yet which is of an extremely simple, low-cost arrangement of elements, as hereinafter set forth in detail.

Referring more particularly to the drawing, my improved wheel chock 10 is conventionally mounted upon the wheel 11 of an automobile to embrace the tire 12 and extend beyond to the rim 13 of the wheel. When mounted upon the wheel, the chock is secured at its base by a lock 14. It also includes a hub cap cover plate 15 which is adapted to bear against the hub of a wheel to prevent removal of the hub cap and removal of lug nuts, and of the wheel itself from the automobile, for removal of the wheel will defeat the purpose of the chock.

Figure 2:
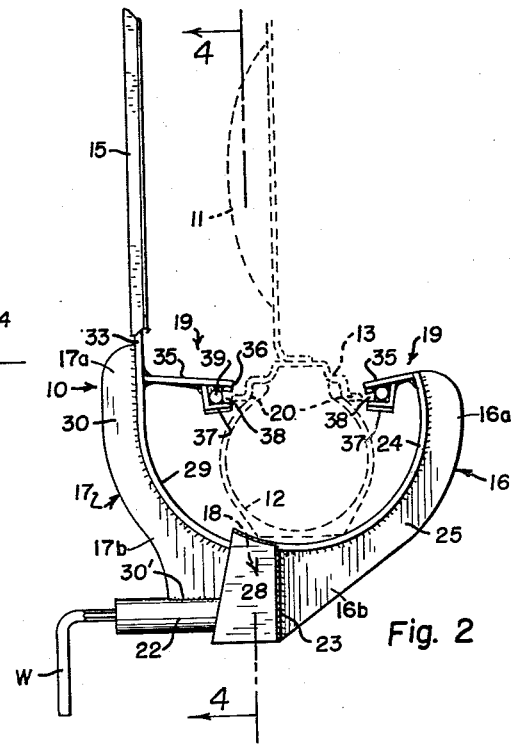
Figure 3:
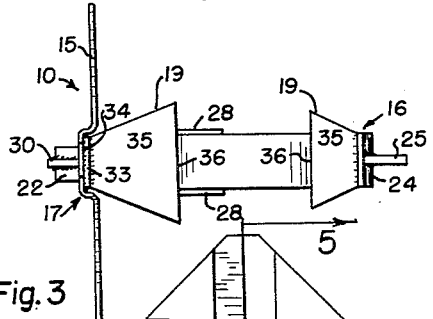
Figure 3 is a plan view of the chock.
Figure 4:
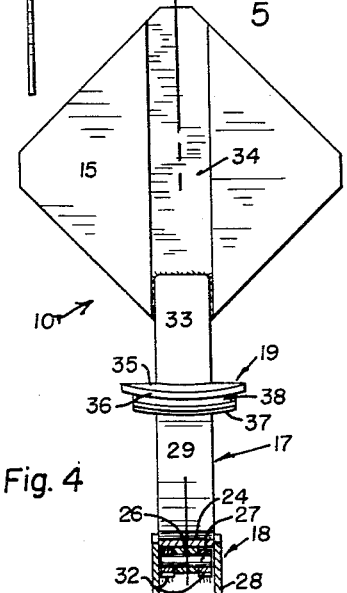
Figure 4 is a sectional elevation view of the chock as taken from the indicated line 4—4 at Fig. 2.
Figure 5:
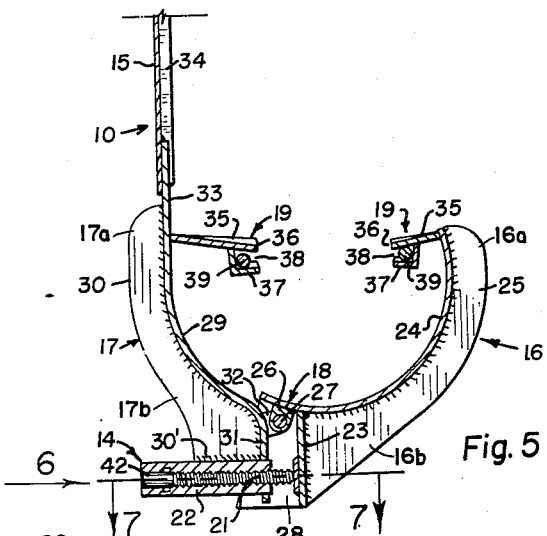
Figure 5 is a sectional view of the chock as taken substantially from the indicated line 5—5 at Fig. 4, but with the top portion being broken away to conserve space.
Figures 6, 7:
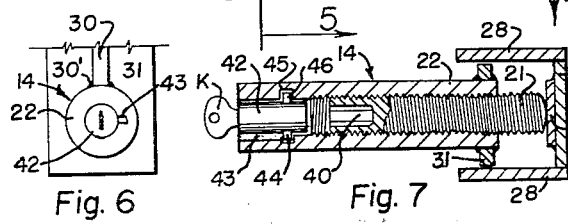
Figure 6 is a fragmentary elevational detail as taken from the indicated arrow 6 at Fig. 5, but on an enlarged scale.
Figure 7 is a sectional plan view as taken from the indicated line 7—7 at Fig. 5, but on an enlarged scale.

The chock 10 is generally formed with an inner arm 16 and outer arm 17 secured together by a hinge 18, with an arcuate grasping portion 16a and 17a of each arm being located at one side of the hinge and a base portion 16b and 17b being located substantially at the other side thereof. The grasping portion of each arm is adapted to embrace a portion of a tire 12 and a rim-grasping head 19 extends inwardly from the end of each arm to grasp the edge bead 20 of the rim periphery as indicated by broken lines at Fig. 2. These grasping portions of the arms are forcibly moved together by rotation about the hinge 18 by spreading the base portions 16b and 17b apart. This spreading action is effected by turning a lead screw 21 in a threaded socket 22 at the base of the outer arm 17 and against an abutment plate 23 at the base portion 16b of the inner arm 16, all as hereinafter further described.

The general construction of this unit is by welded fabrication of steel plates, and the inner arm 16 is formed as an arcuate flange 24 of an approximate 100 degree extent. This flange 24 is reinforced by an outstanding transverse gusset or web 25 at the center of the flange which extends thereabout from the top portion to the abutment plate 23 at the base therof. The abutment plate 23 depends from the flange 24 as a member of the same width as the flange 24. A portion of the flange 24 extends beyond the abutment plate to form a lip to hold a centered hinge bearing 26 through which the pintle 27 of the hinge 18 extends. This overhanging lip portion of the flange 24 is enclosed at each side by cover-side plates 28 which extend along the flange 24 at one edge and along the edges of the abutment plate 23 to form a pocket wherein the hinge 18 and the extension of the lead screw 21 lie.

The outer arm 17 is of similar construction with an arcuate flange 29 of an approximate 90-degree extent and this flange 29 is reinforced by an outstanding transverse web 30 in spaced opposition with the web 25 of the inner arm 16. However, the lower portion of the flange 29 is turned downwardly to form a leg 31 in spaced opposition with the abutment plate 23. Spaced hinge bearings 32 are mounted at the turn point of the flange, which register with and at each side of the hinge bearing 26 to receive the pintle 27 to form the hinge 18. The lead screw socket 22 is mounted in this leg to outstand therefrom substantially normal from the surface of the opposing abutment plate 23 and the lower edge of the web 30 is welded to the top of the socket as at 30′.

The upper portion of the outer arm flange 29 extends upwardly beyond the end of the gusset 30 as an upstanding leg 33 to support the hub cap cover plate 15. The hub cap cover plate is formed in any suitable manner as in the diamond shape illustrated and with a vertically disposed channel 34 wherein the leg 33 lies, the channel 34 providing for reinforcement preventing outward pulling of the plate, acting as a corrugate-type reinforcement of the plate.

Each rim-grasping head 19 is formed as a warped frusto-conical plate 35 welded to its respective arm flange 24 and 29 to extend inwardly from the flange toward the opposing head. The inward contact edge 36 of this plate is formed with a curvature adapted to match the curvature of the edge of a wheel rim 13. A curved angle-bar 37 is mounted underneath the plate 35 with an edge thereof being aligned in uniform spacing with the plate contact edge to form a channel-groove 38 below the edge 36, and this groove 38 is adapted to receive the edge bead 20 of the wheel rim 13. A rod 39 may be set in this angle bar 37 to hold it in place and provide for a more rigid welded construction.

The lead screw 21 is formed as a heavy threaded cylindrical bar, having one end roundly chamfered to contact the abutment plate 23 or if desired, to contact a pad 41 on the plate 23, and having the other end socketed as at 40 to receive a wrench w to secure the chock 10 to the rim of an automobile wheel. The socket 22 is a heavy internally threaded tube adapted to hold the lead screw 21 with a tight turning fit. The socket 22 is of sufficient length to permit the lead screw 21 to set completely within the socket passage and provide room for holding a cylindrical type lock tumbler 42 at its outer end. The outer end of this socket is formed without threads to receive and snugly hold the tumbler 42. A longitudinal way 43 is cut in the wall thereof to receive a guide pin 44 on the tumbler and with a circumferential groove 45 is cut within the socket to receive a lock pin 46 of the tumbler, operated by a key k. With a proper key k, the tumbler can thus be locked in the socket 22 at a location where it cannot be tampered with.

Operation of this unit to secure it onto an automobile is simple. By removing the tumbler 42 the wrench w may be first used to retract the lead screw 21 and spread the grasping portions of the arms 16 and 17. The chock is then placed over an automobile wheel and the arms moved together to place the channels 38 upon the rim beads 19. Next, using the wrench, the lead screw 21 is extended to bear against the abutment plate 23 or pad 41 to tightly hold the rim of the wheel within the embrace arms 16 and 17. Finally the tumbler 42 is replaced to lock the unit.

While I have now described my invention in considerable detail, it is obvious that others skilled in the art can device and build alternate and equivalent constructions which are within the scope and spirit of my invention; hence, I desire that my protection be limited, not by the constructions illustrated and described, but only by the proper scope of the appended claim.

I claim:

A wheel chock for immobilizing an automobile by embracing a tire and gripping the rim of a wheel and comprising, a pair of arms, hinge means interconnecting the arms in spaced opposition with each other, each arm including two portions, a grasping portion at one side of the hinge means and a base portion at the other side of the hinge means, a threaded socket in the base portion of the first of said arms and an abutment in the base portion of the second of said arms opposing the socket, a lead screw in the socket adapted to extend therethrough and to and against the abutment whereby turning of the lead screw in the socket and against the abutment will spread the base portions apart and move the grasping portions together as against a tire rim, lead screw locking means at the socket adapted to prevent shifting of the lead screw when extended against the abutment, and side plates at the base portion of said second arm overlapping the abutment, the hinge means and the adjacent edge of the base portion of the first said arm to form a pocket in which the hinge means and extending end of the lead screw is confined.

References Cited in the file of this patent

UNITED STATES PATENTS

| | | |
|---|---|---|
| 1,408,133 | Ochs et al. | Feb. 28, 1922 |
| 1,508,547 | Gentle et al. | Sept. 16, 1924 |
| 1,515,097 | Dickson | Nov. 11, 1924 |
| 1,656,253 | Weaver et al. | Jan. 17, 1928 |
| 1,800,708 | Wartian | Apr. 14, 1931 |
| 2,345,949 | Robbins | Apr. 4, 1944 |
| 2,844,954 | Marugg | July 29, 1958 |

FOREIGN PATENTS

| | | |
|---|---|---|
| 539,449 | France | Apr. 3, 1922 |